G. M. THIRKITTLE.
Grain and Seed Drill.

Patented Oct. 4, 1870.

Witnesses:
Frederick Eberts
S. J. Spray

Inventor:
G. M. Thirkittle
Per attorney
Thos. J. Sprague.

G. M. THIRKITTLE.
Grain and Seed Drill.
No. 107,980.
2 Sheets—Sheet 2.
Patented Oct. 4, 1870.
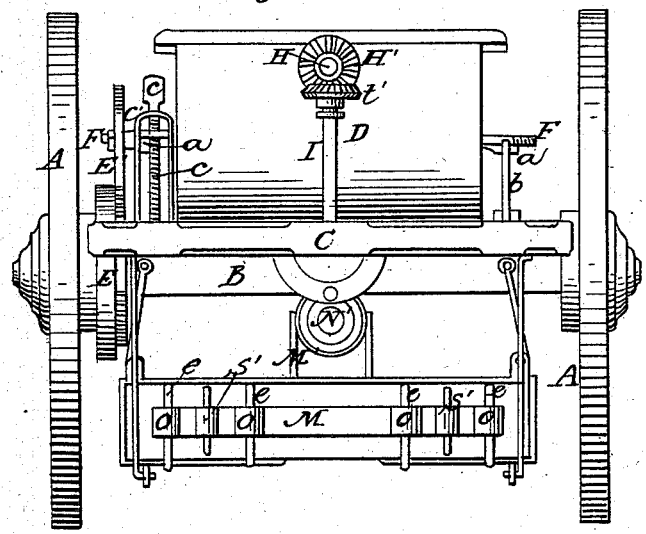
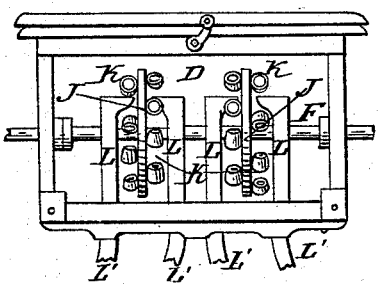
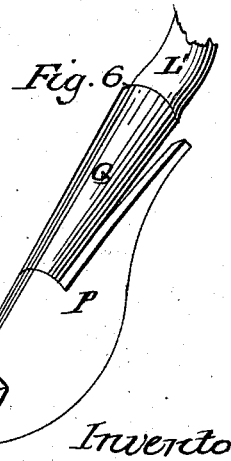
Witnesses:
Frederick Eberts
Samuel J. Spray
Inventor.
G. M. Thirkittle
Per attorney
Thos. S. Sprague

United States Patent Office.

GEORGE M. THIRKITTLE, OF BELLEVILLE, MICHIGAN.

Letters Patent No. 107,980, dated October 4, 1870.

IMPROVEMENT IN GRAIN AND SEED-DRILLS.

The Schedule referred to in these Letters Patent and making part of the same.

*To whom it may concern:*

Be it known that I, GEORGE M. THIRKITTLE, of Belleville, in the county of Wayne, and State of Michigan, have invented a new and useful Improvement in a Grain and Seed-Drill; and I do declare that the following is a true and accurate description thereof, reference being had to the accompanying drawing and to the letters of reference marked thereon and being a part of this specification.

The nature of this invention relates to the construction of a drill for sowing all kinds and sizes of grains and seeds, in regulated quantities, in rows of any desired distance apart.

The invention consists in the peculiar arrangement on an axle of a proper frame, from which is suspended a series of adjustable colters, carrying the seed-spouts, and so connected with a windlass on the frame as to be lifted clear of the ground, and by the same means forced into the ground to any desired depth; in the peculiar construction and method of operating the feed-shaft, whereby the same is rotated at any required speed; in a novel seeding device, consisting of elevator-cups mounted on each side of the periphery of a series of disks on the seed-shaft, which elevate and discharge into the seed-conductors the grain or seed to be sown in uniform quantities, the cups being double-ended, so that by reversing the seed-shaft the smaller cups may be brought into use for delivering smaller quantities in sowing small seeds; also, in the general arrangement and adjustability of its various parts, as more fully hereinafter set forth.

Figure 3 is a front elevation.

Figure 4 is a detached elevation of the seeding mechanism, the rear plate of the seed-box being removed to show the interior arrangement thereof.

Figure 5 is a section of one of the seed-cups.

Figure 6 is a perspective view of one of the colters.

Like letters indicate like parts in each figure.

In the drawing—

Figure 1:
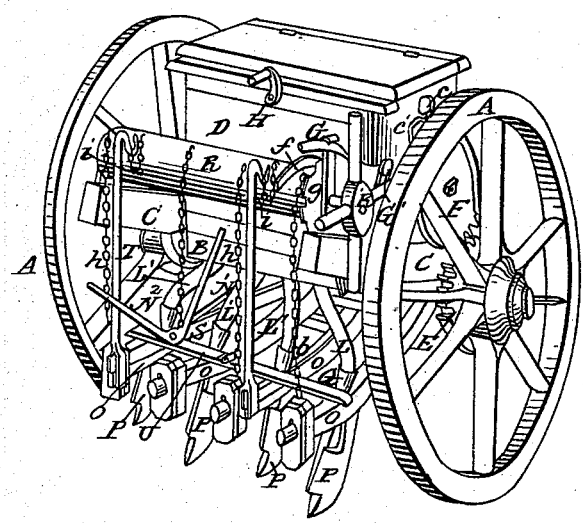
Figure 1 is a perspective view of my improved seed-drill.
Figure 2:
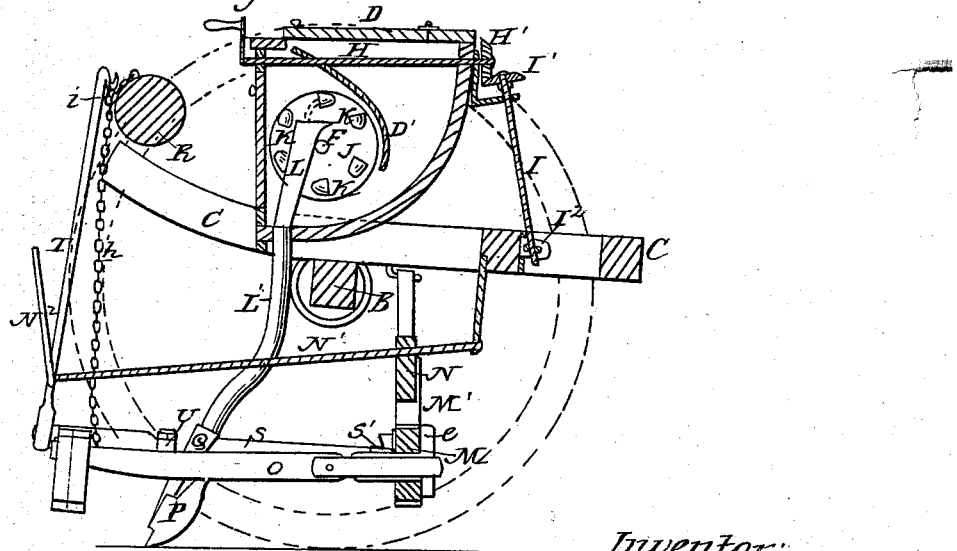
Figure 2 is a vertical longitudinal section on the line $x\ x$ in fig. 1.

A are traction-wheels mounted at either end of the straight axle B, on and to which is secured a frame, C.

D is the seed-box, having a trunnion, $a$, at each end, which trunnions rest in the brackets $b\ b'$, rising from the frame C, the latter having a vertical adjustment by means of the screw $c$, in the standard $c'$, rising from the frame Q on the same side of the machine. The hub of the traction-wheel is provided with two (or more, if necessary,) spur-wheels E, of varying diameters, with one of which the pinion E' on the seed-shaft F, journaled through the seed-box, meshes, and the shaft is thereby rotated. Raising the bracket $b'$ by its screw $c$, the pinion may be geared with the larger of the spur-wheels E by shifting it on its shaft F, giving the latter an increased speed.

G is a lever, pivoted in a standard, G', on the same side of the main frame, with its short arm under the trunnion at the end of the seed-box, so that the driver, by depressing and hooking down the long arm, may raise the shaft F and its pinion out of gear with the spur-wheel which drives it, when the seed mechanism will not be operated by the movement of the machine.

H is a cranked shaft extending through the seed-box from rear to front where it is provided with a bevel-gear, H', engaging with and rotating a corresponding one, $I^1$, on a threaded shaft, I, working through a swivel-nut, $I^2$, pivoted to a cross-beam in the frame in the front of the box.

By means of the crank on the shaft H, the driver may incline the seed-box forward or back, by rotating the shaft I, for the purpose hereinafter explained.

J are a series of disks, adjustably secured to the seed-shaft, and have mounted, at either side of their peripheries, a series of cups, K. These cups, as shown, are double, having a large depression on one face and a small one on the other.

The seed-box has a semicircular inner shell, D', inclosing the disks, except at a point in the front of each, where seed is contained in the space between the shell and the front wall of the box, which is cut away to feed the seed to the cups, which, in their rotation, take up the seed, and throw it into the mouths of the seed-conductors L, one of which is arranged at either side of each disk, the seed passing into the flexible seed-tubes L' below.

M is a slotted transverse bar or frame, suspended from the main frame in the front of the axle, and is so arranged as to receive a lateral movement from the eccentric N, operating in the yoke M' on the bar, the eccentric being fixed to the front end of a rod, $N^1$, longitudinally journaled under the main frame, and provided, at its rear end, with treadles, $N^2$, by means of which the operator, with his hand or foot, may partially rotate the rod, and thus laterally move the bar M in either direction.

O are hinged or jointed drag-bars, with their heads projecting through the slot in the frame M, where they are properly secured, by the keys $e$, at any required distance apart.

From the main portion of the drag-bars depend the colter-teeth P, of the peculiar form shown, and rigidly secured to the drag-bars, through which and the lower front part of the teeth project the seed-spouts Q, which receive and deliver in the trenches the seed from the tubes L'.

The important feature of the colter-tooth shown is in the facility and ease with which its deep-cutting knife-edge cuts its way in the ground, and by the insweeping curve of its sides toward the rear allows the earth to fall in and close the trench on the seed.

R is a windlass, journaled in suitable bearings in the rear end of the main frame, and is provided with a hand-wheel, R', and pawl $f$, engaging with its ratchet $g$.

To the windlass is secured a series of chains, $h$, each of which is secured to one of the drag-bars, so that by rotating the windlass in one direction the coulters will be lifted clear of the ground.

S S are levers, pivoted at their front ends to heads S', keyed in the slot in the frame M. To their rear ends are pivoted the upright levers T T, connected at their tops, by short chains, $i$, to the windlass. To each of the levers is secured a transverse bar, U, covering one-half of the drag-bars. These bars U are hinged together, as shown. By reversing the windlass the chains $i$ are strained under the windlass, and force the drag-bars down until the colter-teeth enter the earth at a proper depth.

In addition to this means of securing depth of trench, the rear ends of the drag-bars are weighted, as shown, to keep the colters in the ground in passing hollow spots, where the tension of the chains $i$ would be more or less relaxed.

In operation the speed of the seed-shaft must be proportioned to the kind of seed and amount to be sown by the means hereinbefore described; and this may be still further regulated by placing slides in the openings in the shell, which allows the seed to pass from the box to the cups.

As shown in the sectional figures, the disks and cups are arranged for sowing wheat and coarse grain.

To sow clover and other small seeds, the seed-shaft is reversed, the pinion being placed on its opposite end, which is then over the driving-gear, and the disks reversed in position on the shaft, so that in the rotation of the latter the small cups will be uppermost, and take up the seed to drop in the conductors.

The driver should walk behind the machine to correct the alignment of the rows made, which he does by laterally moving the frame M through the treadle-levers $N^2$ to the right or left, as may be necessary.

In going up or down a hill, the cups would manifestly throw the grain too far past or let it fall short of the seed-conductors. For this contingency the screw I is rotated by the cranked shaft H to tilt the seed-box forward or back on its trunnions, so that the seed will fall into the conductors.

What I claim as my invention, and desire to secure by Letters Patent, is—

1. In seed-drills, the construction and arrangement, with the frame C, of the slotted bar M, yoke M', eccentric N, rod N', and levers $N^2$, as and for the purpose set forth.

2. The seed-shaft F, disks J, and cups K, in connection with the seed-box D and conductors L, substantially as described, for the purpose specified.

3. The construction and arrangement of the seed-box D, having its shaft F rotating in the trunnion-bearings $a$, oscillating in the brackets $b\ b'$, with the standard $c'$, screw $c$, pinion E', driving-gears E, and lever G, as and for the purpose set forth.

4. The construction and arrangement of the frame C, seed-box D, provided with the inner shell or apron D' and trunnions $a$, the brackets $b\ b'$, standard $c'$, screw $c$, seed-shaft F, pinion E', driving-gears E, lever G, shafts H and I, gears H' and I', swivel-nut $I^2$, disks J, cups K, conductors L L', slotted bar M, yoke M', eccentric N, rod N', levers $N^2$, drag-bars O, keys $e$, coulter-teeth P, seed-spouts Q, windlass R, hand-wheel R', pawl $f$, ratchet $g$, chains $h$ and $i$, and the levers S, T, and U, when arranged and operating substantially as herein described and shown, for the purposes specified.

GEORGE M. THIRKITTLE.

Witnesses:
FREDERICK EBERTS,
SAMUEL J. SPRAY.